(12) United States Patent
Fredenburg et al.

(10) Patent No.: US 9,290,059 B2
(45) Date of Patent: Mar. 22, 2016

(54) WHEEL ASSEMBLY FOR AN IRRIGATION SYSTEM

(71) Applicant: Lindsay Corporation, Omaha, NE (US)

(72) Inventors: Michael S. Fredenburg, Hickman, NE (US); Thomas J. Korus, Lindsay, NE (US)

(73) Assignee: Lindsay Corporation, Omaha, NE (US)

( * ) Notice: Subject to any disclaimer, the term of this patent is extended or adjusted under 35 U.S.C. 154(b) by 128 days.

(21) Appl. No.: 14/161,151

(22) Filed: Jan. 22, 2014

(65) Prior Publication Data
US 2015/0202926 A1    Jul. 23, 2015

(51) Int. Cl.
*B60B 9/10* (2006.01)
*B60C 11/03* (2006.01)
*B60C 7/00* (2006.01)
*B60C 7/24* (2006.01)

(52) U.S. Cl.
CPC .............. *B60C 11/0311* (2013.04); *B60C 7/00* (2013.01); *B60C 7/24* (2013.01)

(58) Field of Classification Search
CPC .............. B60B 9/00; B60B 9/02; B60B 9/10; B60B 9/14; B60B 25/02; B60B 25/04; B60B 15/025; B60B 15/023; B60B 15/02; B60B 9/04; B60B 9/12; B60C 7/00; B60C 7/10; B60C 7/14; B60C 7/24; B60C 7/26; B60C 11/00; B60C 11/03; B60C 11/0311; B60C 11/0313; B60C 11/0316; B60C 11/032

USPC .............. 152/5, 6, 7, 8, 11, 13, 40; 301/10.1, 301/11.1, 62, 64.701, 64.704, 64.705, 66, 301/67, 73, 74, 79, 80
See application file for complete search history.

(56) References Cited

U.S. PATENT DOCUMENTS

| 3,612,626 | A |   | 10/1971 | Fuchs |   |
|---|---|---|---|---|---|
| 4,944,563 | A | * | 7/1990 | Pinchbeck | ................ B60C 7/24 152/323 |
| 6,131,833 | A |   | 10/2000 | Chapman |   |
| 6,805,311 | B2 |   | 10/2004 | Buller |   |
| 8,490,899 | B2 |   | 7/2013 | Korus |   |
| 2007/0159004 | A1 |   | 7/2007 | St-Amant |   |
| 2013/0284328 | A1 | * | 10/2013 | Korus | ..................... B60B 15/04 152/8 |
| 2013/0284860 | A1 | * | 10/2013 | Korus | ................... A01G 25/092 248/49 |

* cited by examiner

*Primary Examiner* — John Walters
(74) *Attorney, Agent, or Firm* — Hovey Williams LLP

(57) ABSTRACT

A wheel assembly for traversing a path along a ground surface having a layer of soil, the wheel assembly comprising a central support and an airless flexible covering mounted on the central support and having a plurality of rigid sections and a plurality of flexible sections. The outwardly protruding spokes urge the rigid sections into the layer of soil when the rigid sections contact the ground surface. The flexible sections include a set of traction lugs for gripping peaks of a corrugated pattern in the ground surface for improved traction.

20 Claims, 4 Drawing Sheets

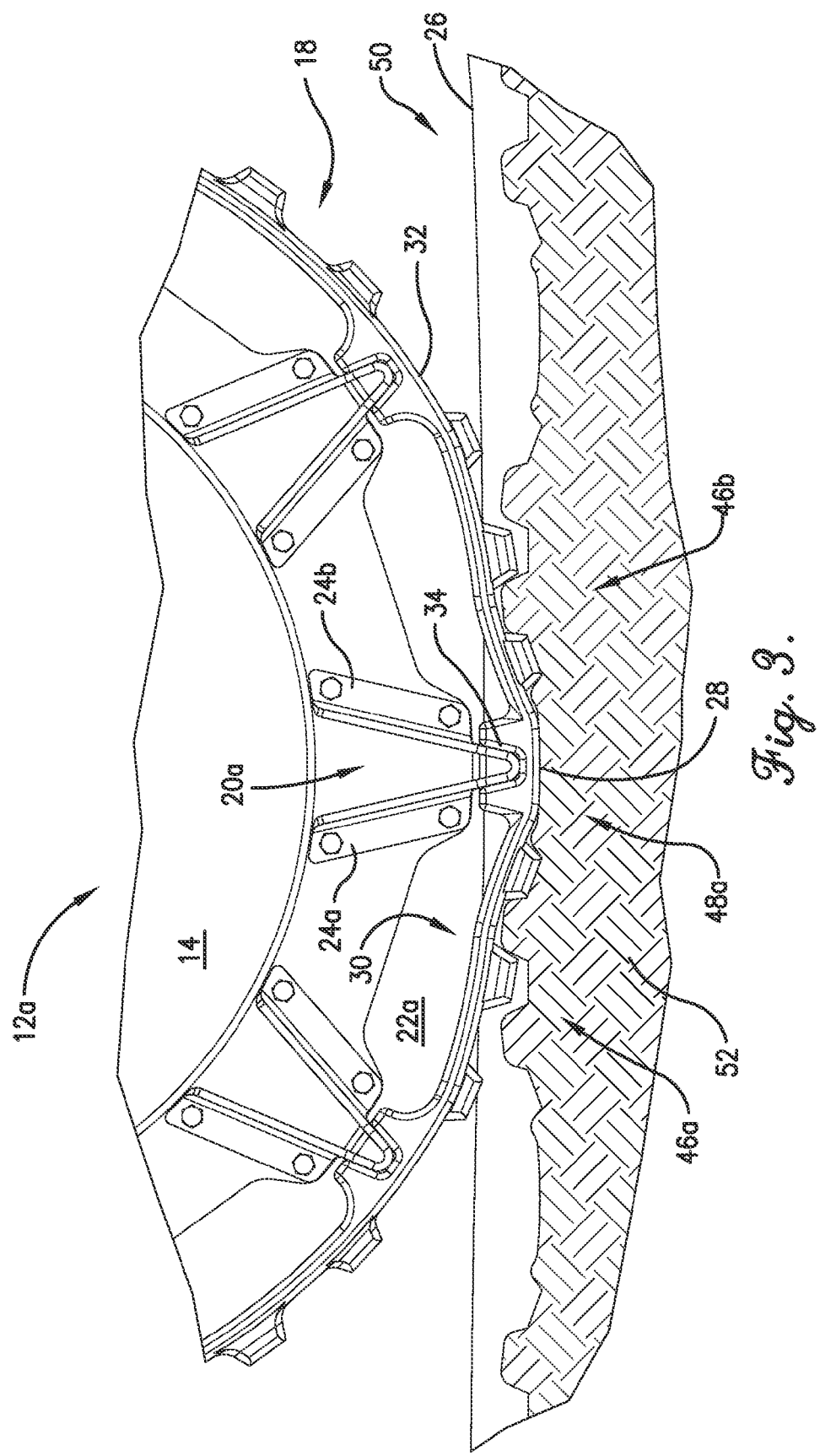

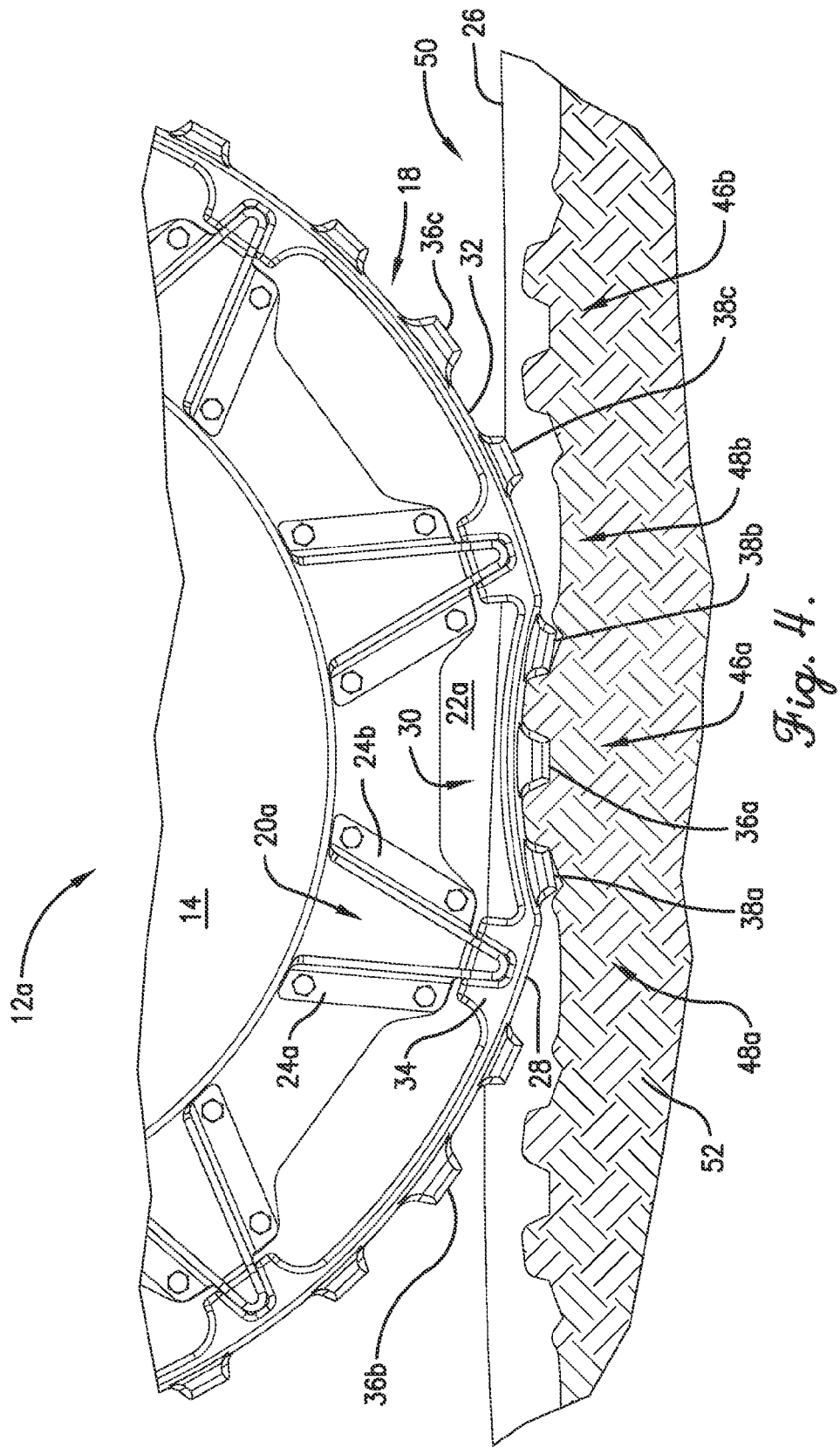

WHEEL ASSEMBLY FOR AN IRRIGATION SYSTEM

BACKGROUND

The present invention relates to wheel assemblies for movable agricultural irrigation systems.

Movable agricultural irrigation systems such as center-pivot and linear systems are commonly used to irrigate large fields and typically include several irrigation spans mounted on movable support towers. Each movable support tower includes two wheel assemblies configured to traverse a path along the ground for moving the irrigation spans across the fields. After multiple passes of the irrigation system, the path often develops deep ruts in which the wheels of the wheel assemblies can become stuck. The path can be repaired by filling the ruts with soil or other material, but this requires a substantial amount of material, is time consuming, and is difficult to do without damaging crops in the process. Alternatively, the wheels of the wheel assemblies can be replaced with wider wheels for traversing un-worn ground adjacent to the path, but this requires an additional set of wheels and further damages the path. Moreover, this solution does not work if the current set of wheels is the widest available. Ruts can also be minimized by shifting the center pivot point by a few feet so that the wheel assemblies create a new path, but this results in the destruction of additional crops and may cause the wheel assemblies to become stuck or misaligned when crossing over the worn path. Also, this requires the installation of additional pipe and electrical center-pivot components.

SUMMARY

The present invention solves the above-described problems and provides a distinct advance in the art of wheel assemblies for irrigation systems. More particularly, the present invention provides a wheel assembly that causes less wear on a field or other area to be irrigated while still providing excellent traction.

A wheel assembly constructed in accordance with an embodiment of the invention broadly comprises a wheel having a set of outwardly protruding spokes that define a set of recesses therebetween and a tire, track, or other covering mounted on the wheel. The covering has a set of rigid sections that are urged by the outwardly protruding spokes of the wheel into a layer of soil on the ground and a set of flexible sections that flex inwardly towards the recesses between the spokes. The covering also has a set of primary and secondary traction lugs on its outer surface. Each primary traction lug is aligned with a middle of a flexible section of the covering and is taller than the secondary traction lugs. The secondary traction lugs are positioned near ends of the flexible sections of the covering and are spaced a greater distance from the adjacent secondary traction lug than from the adjacent primary traction lug.

The wheel and the covering cooperatively form a series of alternating peaks and valleys in the soil in a generally corrugated path. During subsequent passes of the irrigation system, the rigid and flexible sections of the covering line up with the previously created peaks and valleys in the soil to greatly improve the traction of the wheel assembly. Moreover, the wheel assembly urges some of the soil from the valleys to the peaks instead of towards side margins of the path to reduce rut formation. As a flexible section is urged into a recess, its primary traction lug grips the top of the peak. The secondary traction lugs, being positioned on either side of the primary traction lug on the flexible section, are turned slightly inward towards the primary traction lug and grip the sides of the peak.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 3 is an enlarged, fragmentary elevational view of one of the wheel assemblies of FIG. 2; and FIG. 4 is an enlarged, fragmentary elevational view of one of the wheel assemblies of FIG. 2.

Figure 1:
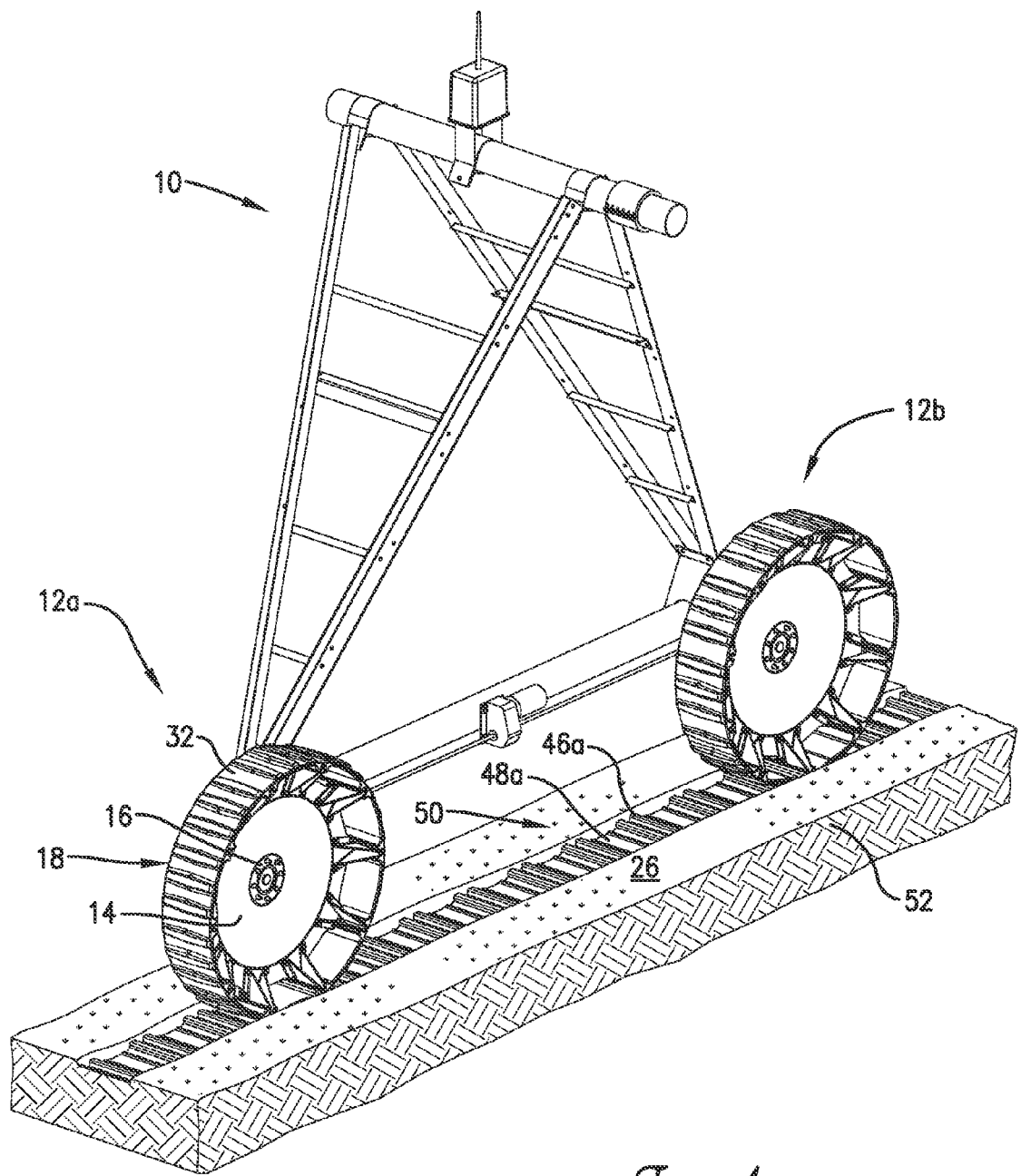
FIG. 1 is a perspective view of an irrigation system support tower on which wheel assemblies constructed in accordance with embodiments of the invention may be mounted.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and particularly FIGS. 1-4, a movable irrigation support structure 10 with first and second wheel assemblies 12*a,b* constructed in accordance with embodiments of the invention is illustrated. The movable support structure 10 is part of an agricultural irrigation system such as a center-pivot or linear irrigation system, a planter, a sprayer, or any other agricultural implement. The movable support structure 10 may join and support movable spans or extensions of the irrigation system that are used to irrigate a field or other area.

The wheel assemblies 12a,b of the present invention are mounted near opposite ends of the movable support structure 10. Because the wheel assemblies 12a,b are essentially identical, only the first wheel assembly 12a will be described in detail.

Figure 2:
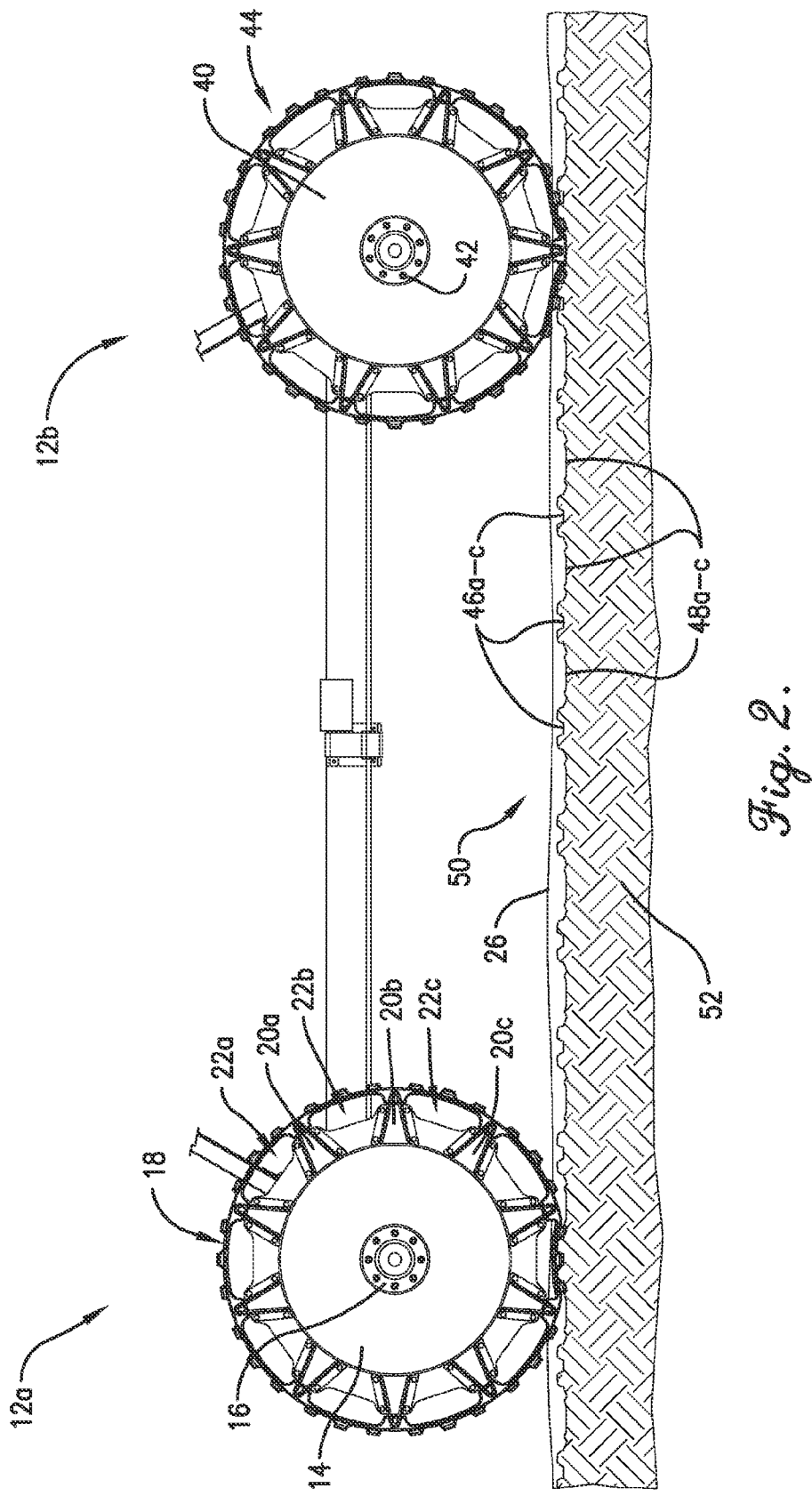
FIG. 2 is an elevational view of the wheel assemblies of FIG. 1 shown forming a generally corrugated track on a ground surface.

As best shown in FIG. 2, the first wheel assembly 12a broadly includes a central support 14 configured to be mounted on a central hub 16 of the movable support structure 10 and a tire, track, or other flexible covering 18 mounted on the central support 14.

The central support 14 may be a wheel, a sprocket, a cog, or a similar component. The central support 14 is rotatably coupled to the movable support structure 10 via the central hub 16 and may be attached to the central support 14 via holes that receive threaded shafts of the central hub 16. The central support 14 includes a set of approximately 10 outwardly protruding spokes (e.g., outwardly protruding spokes 20a-c) configured to engage the airless flexible covering and a set of recesses (e.g., recesses 22a-c) between the outwardly protruding spokes configured to receive the flexible sections of the airless flexible covering 18.

Because the outwardly protruding spokes 20a-c are essentially identical, only the outwardly protruding spoke 20a will be described. The outwardly protruding spoke 20a includes prongs 24a,b and forms a U or V shape, as shown in FIG. 3. The prongs 24a,b are configured to distribute compression forces to the central support 14 for decreasing maximum point loads when the outwardly protruding spoke 20a engages the ground surface 26. The outwardly protruding spoke 20a presents gradually curved outer edges configured to prevent the airless flexible covering 18 from developing folds when contacting the ground surface 26. The outwardly protruding spoke 20a may be attached to the central support 14 via bolts, hinges, or other fasteners and may be partially or completely detachable or retractable for mounting the airless flexible covering 18 onto the central support 14.

The recesses 22a-c are concave areas between the outwardly protruding spokes 20a-c and each are configured to receive a flexible section of the airless flexible covering 18 (described below) when engaging the ground surface 26, as best shown in FIG. 4.

The airless flexible covering 18 is provided for engaging the ground surface 28, for providing additional traction, and for protecting the central support 14, as shown in FIGS. 3 and 4. The airless flexible covering 18 may be a tire, a belt, or a linked track and is formed of molded rubber or other relatively pliable high friction material. The airless flexible covering 18 may be approximately 12.5 inches wide and includes a set of rigid sections (e.g., rigid section 28) configured to align with the outwardly protruding spokes 20a-c, a set of flexible sections (e.g., flexible section 30) configured to align with the recesses 22a-c, and an outer surface 32 configured to contact the ground surface 26, as described below.

Because the rigid sections are essentially identical, only the rigid section 28 will be described. The rigid section 28 includes an inwardly facing mounting boss 34 for receiving the outwardly protruding spoke 20a. The mounting boss 34 includes a gradually curving contour such that a thickness of the airless flexible covering 18 increases towards the mounting boss 34 for reducing fatigue near the mounting boss 34. The mounting boss 34 is configured to maintain a rotational alignment of the airless flexible covering 18 with the central support 14 and to prevent the airless flexible covering 18 from shifting laterally with respect to the central support 14.

The flexible sections are intermediate the rigid sections. Because the flexible sections are essentially identical, only the flexible section 30 will be described. The flexible section 30 is aligned with a recess 22a and is urged into the recess 22a when engaging the ground surface 26, as best shown in FIG. 4. When not engaging the ground surface 26, the flexible section 30 may revert to an outwardly arcuate shape.

The outer surface 32 is configured to contact the ground surface 26 and is substantially flat from its left edge to its right edge. The outer surface 32 includes a plurality of primary traction lugs 36a-c and a plurality of secondary traction lugs 38a-c.

Because the primary traction lugs 36a-c are essentially identical, only the primary traction lug 36a will be described. The primary traction lug 36a is aligned with the middle of the flexible section 30 and has a height greater than the secondary traction lugs 38a-c, as best shown in FIG. 4. The primary traction lug 36a may have an elongated shape and may be widest at its middle point and narrowest at its ends (FIG. 1).

The secondary traction lugs 38a-c are also essentially identical, so only the secondary traction lug 38a will be described. The secondary traction lug 38a is positioned between the middle of the flexible section 30 and the middle of the adjacent rigid section 28, as best shown in FIG. 4. The secondary traction lug 38a is spaced a greater distance from the adjacent secondary traction lug 38b than from the adjacent primary traction lug 36a. The secondary traction lug 38a may have an elongated shape and may be widest at its middle point and narrowest at its ends (FIG. 1).

Turning again to FIG. 2, the second wheel assembly 12b includes a second central support 40 configured to be mounted on a second central hub 42 of the movable support structure 10 and a second airless flexible covering 44 mounted on the second central support 40.

The second central support 40 is essentially identical to the first central support 14, and the second airless flexible covering 44 is essentially identical to the first airless flexible covering 18. The second central support 40 is spaced from and aligned with the first central support 14 so that the second central support 40 traverses a path along the ground surface 26 after the first central support 14.

The above-described wheel assemblies 12a,b provide several advantages over conventional wheels. For example, the wheel assemblies 12a,b create a pattern in the ground that improves wheel traction on subsequent passes of the irrigation system. The wheel assemblies 12a,b also maintain a rotational alignment with the pattern and rotationally realign themselves if they become rotationally misaligned with the pattern. Moreover, the wheel assemblies 12a,b create less wear on the path traversed by the movable support structure 10 and minimize rut formation in the path.

Specifically, as shown in FIGS. 2-4, the above-described first wheel assembly 12a forms alternating peaks 46a-c and valleys 48a-c in a generally corrugated track 50 in a layer of compliant soil 52 on the ground surface 26 along the path traversed by the movable support structure 10. As a portion of the wheel assembly 12a engages the ground surface 26, the outwardly protruding spokes 20a-c of the central support 14 urge the rigid sections of the airless flexible covering 18 into the soil 52 and form the valleys 48a-c of the corrugated track 50 by urging some of the soil 52 forwards or backwards along the path, as best shown in FIG. 3. The recesses 22a-c of the central support 14 receive the flexible sections of the airless flexible covering 18 and form the peaks 46*a-c* between the valleys 48*a-c* with the soil 52 urged out of the valleys 48*a-c*, as best shown in FIG. 4.

In addition, the primary and secondary traction lugs 36*a-c* and 38*a-c* of the airless flexible covering 18 grip the peaks 46*a-c* of the corrugated track 50 as the flexible sections of the airless flexible covering 18 are urged into the recesses 22*a-c*. For example, the primary traction lug 36*a* grips the top of the peak 46*a* of the corrugated track 50, and the secondary traction lugs 38*a,b*, being positioned between the middle and ends of the flexible section 30, are turned slightly inward towards the adjacent primary traction lug 36*a* and grip the sides of the peak 46*a*, thus improving traction.

Features of the second wheel assembly 12*b* engage common engagement points of the corrugated track 50 with features of the first wheel assembly 12*a* when the second wheel assembly 12*b* is rotationally synchronized with the first wheel assembly 12*a*, as shown in FIG. 2. That is, outwardly protruding spokes of the second central support 40 are urged into the valleys 48*a-c* of the corrugated track 50, and recesses of the second central support 40 meet the peaks 46*a-c* created or previously traversed by the outwardly protruding spokes 20*a-c* and recesses 22*a-c* of the first central support 14. In addition, primary and secondary traction lugs of the second airless flexible 44 covering grip the previously traversed peaks 46*a-c*. This synchronization reinforces the corrugated track 50 and further improves traction and is particularly beneficial for when the layer of soil 52 is compliant, such as after a rainfall or in muddy circumstances.

Features of the second wheel assembly 12*b* engage different engagement points of the corrugated track 50 than features of the first wheel assembly 12*a* when the second wheel assembly 12*b* is unsynchronized (or offset) with the first wheel assembly 12*a*. That is, outwardly protruding spokes of the second central support 40 meet the peaks 46*a-c* of the corrugated track 50, and recesses of the second central support 40 meet the valleys 48*a-c* created or previously traversed by the recesses 22*a-c* and outwardly protruding spokes 20*a-c* of the first central support 14. This offset alignment reduces the corrugation effect and may be beneficial when the layer of soil 52 is less compliant, such as during a dry period.

When the wheel assemblies 12*a,b* are rotationally synchronized, they may positively maintain a rotational alignment with the corrugated track 50. For example, the outwardly protruding spokes 20*a-c* of the first wheel assembly 12*a* maintain a rotational alignment of the first wheel assembly 12*a* with the corrugated track 50 by repeatedly engaging the valleys 48*a-c* of the corrugated track 50 during subsequent passes along the path. This helps the wheel assemblies 12*a,b* preserve the corrugated track 50 and maintain improved traction as the movable support structure 10 traverses the path.

The wheel assemblies 12*a,b* also rotationally realign themselves if they become rotationally misaligned with the corrugated track 50. For example, the rigid section 28 of the airless flexible covering 18, being substantially exposed to the ground surface 26 by not having traction lugs located on its outer surface area, will slip against the peak 46*a* of the corrugated track 50 until the primary and the secondary traction lugs 36*a*, 38*a,b* begin to grip the peak 46*a* and the outwardly protruding spoke 20*a* engages the valley 48*a* if the wheel assembly 12*a* becomes rotationally misaligned with the corrugated track 50. Again, this helps the wheel assemblies 12*a,b* preserve the corrugated track 50 and maintain improved traction as the movable support structure 10 traverses the path.

Moreover, the wheel assemblies 12*a,b* retain soil 52 in the path traversed by the movable support structure 10. For example, the substantially flat outer surface 34 of the first wheel assembly 12*a* engages the soil 52 evenly from its left edge to its right edge, which prevents much of the soil 52 from being urged to side margins of the corrugated track 50. This helps the wheel assemblies 12*a,b* create less wear on the path and minimize rut formation therein.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A wheel assembly for traversing a path along a ground surface having a layer of soil, the wheel assembly comprising:

a central support having a plurality of outwardly protruding spokes that define a plurality of recesses therebetween; and an airless flexible covering mounted on the central support and having a plurality of rigid sections each including an inwardly facing mounting boss for aligning with and engaging the outwardly protruding spokes, a plurality of flexible sections for aligning with the recesses, a plurality of primary traction lugs and a plurality of secondary traction lugs disposed on an outer surface of the airless flexible covering, each primary traction lug being configured to be substantially aligned with a center of one of the recesses, each secondary traction lug being spaced from the primary traction lugs and spaced from adjacent secondary traction lugs a greater distance than from the primary traction lugs, the outwardly protruding spokes being configured to urge the rigid sections into the layer of soil when the rigid sections contact the ground surface and the recesses being configured to permit the flexible sections to flex inwardly towards the recesses when the flexible sections contact the ground surface so that the rigid sections and the flexible sections cooperatively form a corrugated track in the ground surface without urging the soil to side margins of the airless flexible covering, the corrugated track having a plurality of valleys formed by the rigid sections and a plurality of spaced peaks formed by the flexible sections, and the primary traction lugs and the secondary traction lugs being configured to grip the peaks when the flexible sections contact the ground surface.

2. The wheel assembly of claim 1, wherein the primary traction lugs define a height greater than a height of the secondary traction lugs for maintaining the grip on the peaks.

3. The wheel assembly of claim 1, wherein each primary traction lug is adjacent at least one of the secondary traction lugs, each secondary traction lug being configured to turn slightly inward towards an adjacent primary traction lug for gripping a side of one of the peaks when the flexible section is urged into the recess.

4. The wheel assembly of claim 1, wherein the outwardly protruding spokes each present gradually curved outer edges for preventing the airless flexible covering from developing folds when the flexible sections contact the ground surface.

5. The wheel assembly of claim 1, wherein the wheel assembly is configured to automatically rotationally align itself with the corrugated track in the ground surface by slipping until the outwardly protruding spokes engage the valleys of the corrugated track.

6. The wheel assembly of claim 5, wherein the outwardly protruding spokes are configured to retain the rotational alignment of the wheel assembly with the corrugated track by repeatedly engaging the valleys of the corrugated track.

7. The wheel assembly of claim 1, wherein each primary traction lug and each secondary traction lug has a middle section having a maximum width and two opposing ends having a minimum width.

8. The wheel assembly of claim 1, wherein the airless flexible covering includes a plurality of mounting bosses configured to engage the outwardly protruding spokes for maintaining a rotational alignment with the central support and for preventing the airless flexible covering from shifting laterally with respect to the central support.

9. The wheel assembly of claim 8, wherein the mounting bosses include a gradually curving contour for reducing wear on the airless flexible covering.

10. The wheel assembly of claim 8, wherein a thickness of the airless flexible covering increases towards the mounting bosses for reducing wear near the mounting bosses.

11. The wheel assembly of claim 1, wherein the airless flexible covering has a width of 12.5 inches.

12. The wheel assembly of claim 1, wherein the central support includes 10 outwardly protruding spokes.

13. The wheel assembly of claim 1, wherein the airless flexible covering is formed of molded rubber.

14. A support structure of an irrigation system for traversing a path along a ground surface having a layer of soil, the support structure comprising:
    a first and a second wheel assembly, each wheel assembly including:
        a central support having a plurality of outwardly protruding spokes defining a plurality of recesses therebetween; and
        an airless flexible covering mounted on the central support and supported by the outwardly protruding spokes, the airless flexible covering including a plurality of primary traction lugs each configured to be substantially aligned with a center of one of the recesses and a plurality of secondary traction lugs spaced from the primary traction lugs and spaced from adjacent secondary traction lugs a greater distance than from the primary traction lugs, the primary traction lugs defining a height greater than a height of the secondary traction lugs for maintaining the grip on the peaks,
        the outwardly protruding spokes being configured to urge the rigid sections into the layer of soil when the rigid sections contact the ground surface and the recesses being configured to permit the flexible sections to flex inwardly towards the recesses when the flexible sections contact the ground surface so that the rigid sections and the flexible sections cooperatively form a corrugated track in the ground surface, the corrugated track having a plurality of valleys formed by the rigid sections and a plurality of spaced peaks formed by the flexible sections, and
        the primary traction lugs and the secondary traction lugs being configured to grip the peaks when the flexible sections contact the ground surface,
    the central support of the first wheel assembly being configured to be rotationally synchronized with the central support of the second wheel assembly such that the outwardly protruding spokes of the second wheel assembly are configured to engage valleys formed by the outwardly protruding spokes of the first wheel assembly.

15. The support structure of claim 14, wherein each central support is configured to automatically rotationally align itself with the corrugated track in the ground surface by slipping until the outwardly protruding spokes engage the valleys of the corrugated track.

16. The support structure of claim 14, wherein the outwardly protruding spokes are configured to retain the rotational alignment with the corrugated track by repeatedly engaging the valleys of the corrugated track.

17. The support structure of claim 14, wherein the primary traction lugs and the secondary traction lugs assist the outwardly protruding spokes in retaining rotational alignment with the corrugated track by gripping the peaks of the corrugated track.

18. The support structure of claim 14, wherein the primary traction lugs define a height greater than a height of the secondary traction lugs for maintaining the grip on the peaks.

19. The support structure of claim 14, wherein each primary traction lug is adjacent at least one of the secondary traction lugs, each secondary traction lug being configured to turn slightly inward towards an adjacent primary traction lug for gripping a side of one of the peaks when the flexible section is urged into the recess.

20. A wheel assembly for traversing a path along a ground surface having a layer of soil, the wheel assembly comprising:
    a central support having a plurality of outwardly protruding spokes that define a plurality of recesses therebetween and present gradually curved outer edges; and
    an airless flexible covering mounted on the central support and having a plurality of rigid sections each including an inwardly facing mounting boss for aligning with and engaging the outwardly protruding spokes, a plurality of flexible sections for aligning with the recesses, a plurality of primary traction lugs and a plurality of secondary traction lugs disposed on an outer surface of the airless flexible covering, each primary traction lug being configured to be substantially aligned with a center of one of the recesses, each secondary traction lug being spaced from the primary traction lugs and spaced from adjacent secondary traction lugs a greater distance than from the primary traction lugs,
    the outwardly protruding spokes being configured to urge the rigid sections into the layer of soil when the rigid sections contact the ground surface and the recesses being configured to permit the flexible sections to flex inwardly towards the recesses when the flexible sections contact the ground surface so that the rigid sections and the flexible sections cooperatively form a corrugated track in the ground surface without urging the soil to side margins of the airless flexible covering,
    the corrugated track having a plurality of valleys formed by the rigid sections and a plurality of spaced peaks formed by the flexible sections, and
    the primary traction lugs and the secondary traction lugs being configured to grip the peaks when the flexible sections contact the ground surface,
    wherein the wheel assembly is configured to automatically rotationally align itself with the corrugated track by slipping until the outwardly protruding spokes engage the valleys of the corrugated track and the traction lugs engage the peaks of the corrugated track.

\* \* \* \* \*